(12) United States Patent
Yasuda

(10) Patent No.: US 8,281,643 B2
(45) Date of Patent: Oct. 9, 2012

(54) CETANE NUMBER DETERMINATION APPARATUS FOR FUEL OF DIESEL ENGINE AND METHOD OF DETERMINING CETANE NUMBER OF FUEL OF DIESEL ENGINE

(75) Inventor: Hiromichi Yasuda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 438 days.

(21) Appl. No.: 12/677,982

(22) PCT Filed: Sep. 11, 2008

(86) PCT No.: PCT/IB2008/002353
§ 371 (c)(1),
(2), (4) Date: Mar. 12, 2010

(87) PCT Pub. No.: WO2009/034444
PCT Pub. Date: Mar. 19, 2009

(65) Prior Publication Data
US 2011/0209533 A1 Sep. 1, 2011

(30) Foreign Application Priority Data
Sep. 12, 2007 (JP) ................................. 2007-237220

(51) Int. Cl.
*G01M 15/00* (2006.01)
(52) U.S. Cl. .................. 73/35.02; 73/114.38; 73/114.55
(58) Field of Classification Search ............ 73/35.02, 73/114.16, 114.38, 114.55
See application file for complete search history.

(56) References Cited

U.S. PATENT DOCUMENTS

| 5,050,556 | A | 9/1991 | Williams et al. | |
|---|---|---|---|---|
| 7,027,906 | B2 * | 4/2006 | Araki | 701/104 |
| 7,347,185 | B2 * | 3/2008 | Moriya et al. | 123/435 |
| 7,367,223 | B2 * | 5/2008 | Kettl et al. | 73/53.05 |
| 7,421,884 | B2 * | 9/2008 | Aoyama | 73/35.02 |
| 7,621,174 | B2 * | 11/2009 | Takaku | 73/114.53 |
| 7,926,331 | B2 * | 4/2011 | Tsutsumi et al. | 73/114.38 |
| 8,060,292 | B2 * | 11/2011 | Takahashi et al. | 701/104 |
| 8,191,412 | B2 * | 6/2012 | Doring | 73/114.71 |
| 2006/0196471 | A1 | 9/2006 | Moriya et al. | |
| 2007/0079647 | A1 | 4/2007 | Aoyama | |
| 2007/0163542 | A1 | 7/2007 | Kettl et al. | |

FOREIGN PATENT DOCUMENTS
EP 0 358 419 3/1990
(Continued)

OTHER PUBLICATIONS
Office Action issued Sep. 2, 2011 in Japanese Patent Application No. 2007-237220 (with Partial English translation).
(Continued)

*Primary Examiner* — Freddie Kirkland, III
(74) *Attorney, Agent, or Firm* — Oblon, Spivak, McClelland, Maier & Neustadt, L.L.P.

(57) ABSTRACT

A minute amount of fuel is injected into a combustion chamber during fuel cut, and a cylinder pressure is detected when the minute amount of fuel is being combusted. Then a combustion ratio is calculated based on the detected cylinder pressure, and a determination crank angle, which is used for determining a cetane number based on the combustion ratio, is determined. The cetane number is determined based on the determination crank angle.

6 Claims, 6 Drawing Sheets

FOREIGN PATENT DOCUMENTS

| | | |
|---|---|---|
| EP | 1 033 479 | 9/2000 |
| EP | 1 650 422 | 4/2006 |
| EP | 1 775 584 | 4/2007 |
| JP | 2004 340026 | 12/2004 |
| JP | 2005 320872 | 11/2005 |
| JP | 2005-344557 | 12/2005 |
| JP | 2005-344557 A | 12/2005 |
| JP | 2007 32531 | 2/2007 |
| JP | 2007-40208 A | 2/2007 |
| WO | 2005 119034 | 12/2005 |

OTHER PUBLICATIONS

Decision of Refusal issued Jan. 13, 2012 in Japanese Patent Application No. 2007-237220 (with English translation).

* cited by examiner

CORRELATION BETWEEN
CRANK ANGLE AND MFB

CORRELATION BETWEEN
CRANK ANGLE AND MFB

CETANE NUMBER DETERMINATION APPARATUS FOR FUEL OF DIESEL ENGINE AND METHOD OF DETERMINING CETANE NUMBER OF FUEL OF DIESEL ENGINE

BACKGROUND OF THE INVENTION

1. Field of the Invention

The invention relates to a cetane number determination apparatus for a fuel of a diesel engine and a method of determining a cetane number of a fuel of a diesel engine.

2. Description of the Related Art

It is necessary in a diesel engine, as well as a gasoline engine, to handle various types of fuel in the optimal way. It is important, in terms of reducing emission and improving drivability, to detect a cetane number and perform the optimal fuel injection timing control.

The cetane number is a numerical index that indicates difficulty of diesel knocking occurrence in a diesel engine (that is, knocking resistance or an anti-knocking property), and that indicates self-ignitability. The cetane number is correlated with a delay of ignition. As the cetane number becomes larger, self-ignition is more likely to occur, and knocking is less likely to occur.

Various technologies for determining the cetane number have been proposed (for example, refer to Japanese Patent Application Publication No. 2004-340026 (JP-A-2004-340026)).

The cetane number hardly influences the combustion characteristics in a normal operation region, that is, when a normal fuel injection amount is used. Therefore, it is not easy to accurately determine the cetane number in the normal operation region.

Further, for example, as a method of determining the cetane number, it is conceivable to set a threshold of a heat generation rate $dQ/d\theta$, thereby determining the ignition timing. However, this requires a complicated process, such as a differentiation process, and moreover, the determination result is likely to include a noise when this method is used.

SUMMARY OF THE INVENTION

The invention provides a cetane number determination apparatus for a fuel of a diesel engine, and a method of determining a cetane number of a fuel of a diesel engine, in which it is possible to easily and accurately determine the cetane number of the fuel injected into the combustion chamber.

A first aspect of the invention relates to a cetane number determination apparatus for a diesel engine. The cetane number determination apparatus includes a control device that executes a control so that a minute amount of fuel is injected into a combustion chamber during fuel cut or when a condition of fuel cut is met, and determines a cetane number based on a pressure in a cylinder detected when the minute amount of the fuel is being combusted.

In this configuration, if fuel cut is being performed, that is, the fuel injection is stopped, for example, when the vehicle is running on a slope road, the minute amount of fuel that keeps the driver unaware of an increase of an engine speed, or that hardly influences the torque, is injected into the combustion chamber. Further, the fuel injection amount and the detection error of the ignition timing are correlated with each other. Thus, by using the minute amount of fuel for detecting the ignition timing, it is possible to detect the ignition timing with higher accuracy. Therefore, it is possible to accurately determine the cetane number.

In the configuration as described above, the cetane number determination apparatus may further include: a cylinder pressure sensor that detects the pressure in the cylinder of the diesel engine; and a crank angle sensor that detects a rotational position of a crankshaft of the diesel engine. In the cetane number determination apparatus thus configured, the control device may calculate a combustion ratio in the cylinder with respect to a crank angle determined using the crank angle sensor, based on the pressure in the cylinder, and may determine the cetane number based on the combustion ratio.

In this configuration, the cetane number is determined based on the combustion ratio in the cylinder with respect to the crank angle. Thus, it is possible to more easily determine the cetane number.

A second aspect of the invention relates to a cetane number determination apparatus for a diesel engine. The cetane number determination apparatus includes a cylinder pressure sensor that detects a pressure in a cylinder of the diesel engine; a crank angle sensor that detects a rotational position of a crankshaft of the diesel engine; and a control device that determines the cetane number based on a combustion ratio in the cylinder at a threshold crank angle. In the cetane number determination apparatus, the control device calculates the combustion ratio at the threshold crank angle based on a first pressure in the cylinder at a first crank angle at a combustion start point, a second pressure in the cylinder at a second crank angle at a combustion end point, and a third pressure in the cylinder at the threshold crank angle at a combustion midpoint, and determines the cetane number based on the combustion ratio at the threshold crank angle.

In this configuration, it is possible to determine the cetane number using the values of the cylinder pressure taken at only three combustion points, thereby substantially simplifying the cetane number determination process.

A third aspect of the invention relates to a method of determining a cetane number for a diesel engine. The method includes: injecting a minute amount of fuel into a combustion chamber when it is determined that fuel cut is being performed or when it is determined that a condition of fuel cut is met, in the diesel engine; detecting a pressure in a cylinder when the minute amount of the fuel is being combusted; and determining the cetane number based on the pressure in the cylinder.

A fourth aspect of the invention relates to a method of determining a cetane number for a diesel engine. The method includes: detecting a first pressure in a cylinder at a first crank angle at a combustion start point, a second pressure in the cylinder at a second crank angle at a combustion end point, and a third pressure in the cylinder at a threshold crank angle at a combustion midpoint; calculating a combustion ratio at the threshold crank angle based on the first pressure, the second pressure, and the third pressure; and determining the cetane number based on a correlation map of the calculated combustion ratio at the threshold crank angle and the cetane number.

According to these aspects of the invention, it is possible to provide the cetane number determination apparatus for a fuel of a diesel engine, and the method of determining a cetane number of a fuel of a diesel engine, in which it is possible to easily and accurately determine the cetane number of the fuel injected into the combustion chamber.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, an embodiment of the invention will be described with reference to the attached drawings.

Figure 1:
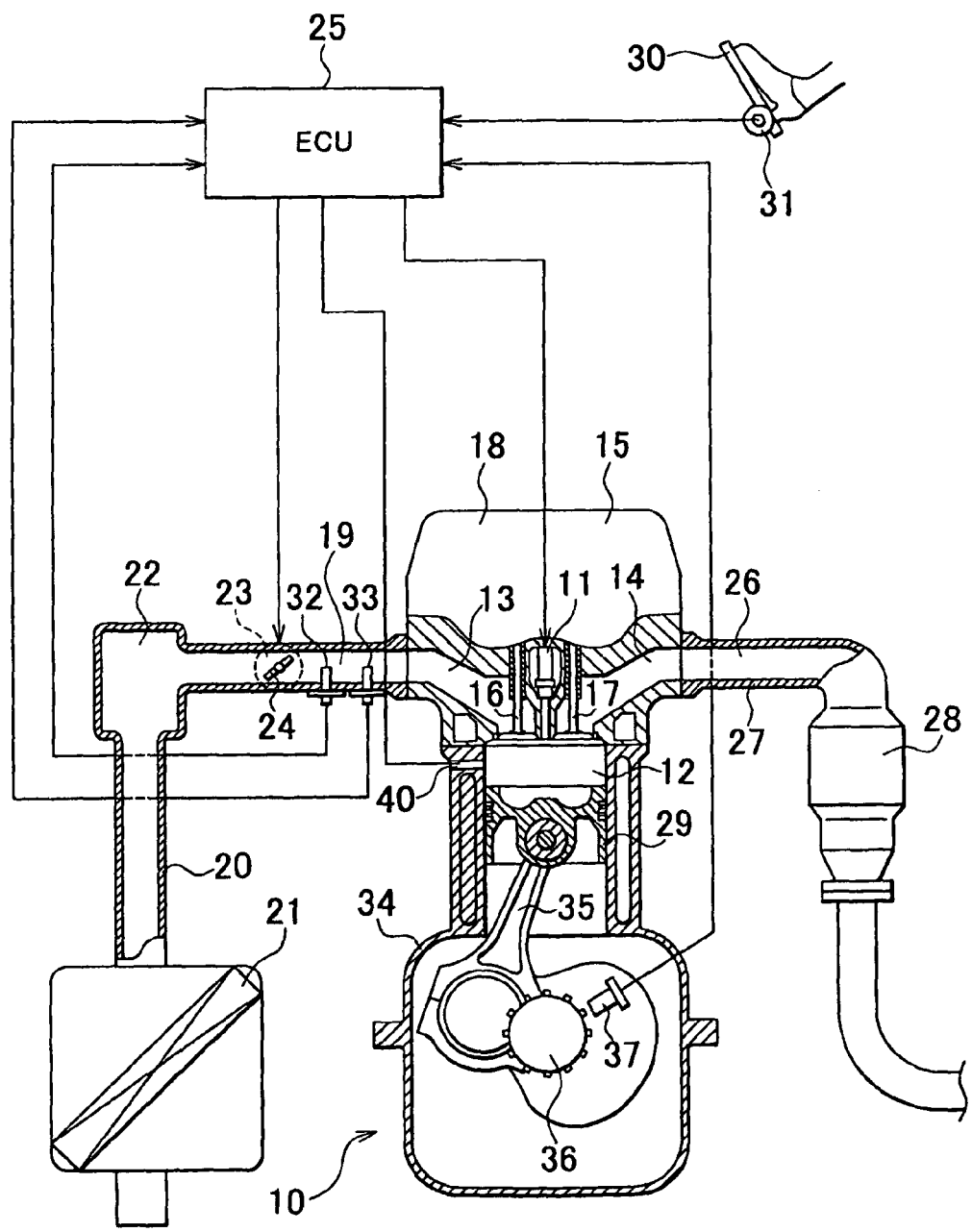
FIG. 1 shows a configuration of a diesel engine to which a cetane number determination apparatus according to an embodiment of the invention is applied.

FIG. 1 shows a configuration of a diesel engine to which a cetane number determination apparatus according to an embodiment of the invention is applied.

In an engine 10, a diesel oil is directly injected as a fuel from a fuel injection valve 11 into a combustion chamber 12 in a compressed state so as to naturally ignite air-fuel mixture.

A cylinder head 15 includes an intake port 13 and an exhaust port 14 connected to the corresponding combustion chamber 12. Further, the cylinder head 15 further includes a valve operating mechanism 18 and a fuel injection valve 11. The valve operating mechanism 18 includes an intake valve 16 that opens and closes the intake port 13, and an exhaust valve 17 that opens and closes the exhaust port 14. The fuel injection valve 11 is disposed at a center of an upper portion of the combustion chamber 12 so as to be positioned between the intake valve 16 and the exhaust valve 17.

An intake pipe 20 is connected to the cylinder head 15 in a manner such that the intake pipe 20 communicates with the intake port 13, and an intake passage 19 is defined by the intake pipe 20 and the intake port 13. An air cleaner 21 is provided upstream of the intake pipe 20. The air cleaner 21 functions to remove dust, etc., contained in the air so that the clean air is supplied to the intake passage 19. A surge tank 22 is formed in the intake pipe 20 at a position upstream of the intake valve 16, and an intake control valve 24 is provided in the intake pipe 21 at a position between the intake valve 16 and the surge tank 22. The intake control valve 24 is operated by an actuator 23 so as to open and close the intake passage 19 at predetermined timings in accordance with the opening and closing timings of the intake valve 16. When the engine 10 includes a plurality of intake ports 13 for each cylinder, the intake control valve 24 may be independently provided for each intake port 13 so as to independently open and close the intake port 13. Further, the intake control valves 24 may be opened and closed on a cylinder-by-cylinder basis. The intake control valve 24 and the actuator 23 have extremely good control response so that the intake control valve 24 is accurately opened and closed at desired timings in accordance with the opening and closing timings of the intake valve 16.

An exhaust pipe 27 is connected to the cylinder head 15 in a manner such that the exhaust pipe 27 communicates with the exhaust port 14, and an exhaust passage 26 is defined by the exhaust pipe 27 and the exhaust port 14. A catalyst 28 functions to purify pollutant produced by the combustion of air-fuel mixture in the combustion chamber 12. The catalyst 28 is provided in the exhaust pipe 27.

Therefore, the intake air flows in the intake pipe 20 through the air cleaner 21 and is supplied into the combustion chamber 12. The air thus supplied into the combustion chamber 12 is mixed with the fuel injected from the fuel injection valve 11 into the combustion chamber 12, whereby the air-fuel mixture is produced. Then, the air-fuel mixture is naturally ignited when a piston 29 is near a compression top dead center, and thus, the air-fuel mixture is combusted. Exhaust gas, which is produced by the combustion, flows in the exhaust pipe 27 through the catalyst 28 and is discharged from the exhaust pipe 27 to the outside air.

Various sensors as listed below are provided in order to detect the operational conditions of the engine 10 and the vehicle in which the engine 10 is mounted so that the ECU 25 accurately controls the amount and timing of the fuel injection from the fuel injection valve 11 and operation of the intake control valve 24. More specifically, an accelerator operation amount sensor 31 is provided so as to detect an operation amount of an accelerator pedal 30 operated by a driver, and output the detected operation amount to the ECU 25. Further, an intake air temperature sensor 32 and an intake air pressure sensor 33 are provided in a portion of the intake pipe 20 downstream of the intake control valve 24. The intake air temperature sensor 32 detects an intake air temperature $T_s$ in the intake passage 19 and outputs the detected temperature $T_s$ to the ECU 25. The intake air pressure sensor 33 detects an intake air pressure in the intake passage 19 and outputs the detected pressure to the ECU 25.

Further, a cylinder pressure sensor 40 is provided to detect the pressure in the combustion chamber 12 of each cylinder.

Further, a crank angle sensor 37 is provided in a cylinder block 34 in which the piston 29 reciprocates. The crank angle sensor 37 detects the rotational position of a crankshaft 36 to which the piston 29 is connected through a connecting rod 35, that is, a crank angle phase, and outputs the detection result to the ECU 25. The crank angle is determined using the crank angle sensor 37.

The ECU 25 controls operation of the fuel injection valve 11, the actuator 23, and the like based on detection signals output from the accelerator operation amount sensor 31, the intake air temperature sensor 32, the intake air pressure sensor 33, the crank angle sensor 37, the cylinder pressure sensor 40, and the like so that the engine 10 is smoothly operated in accordance with a program that is preliminarily set.

Figure 2:
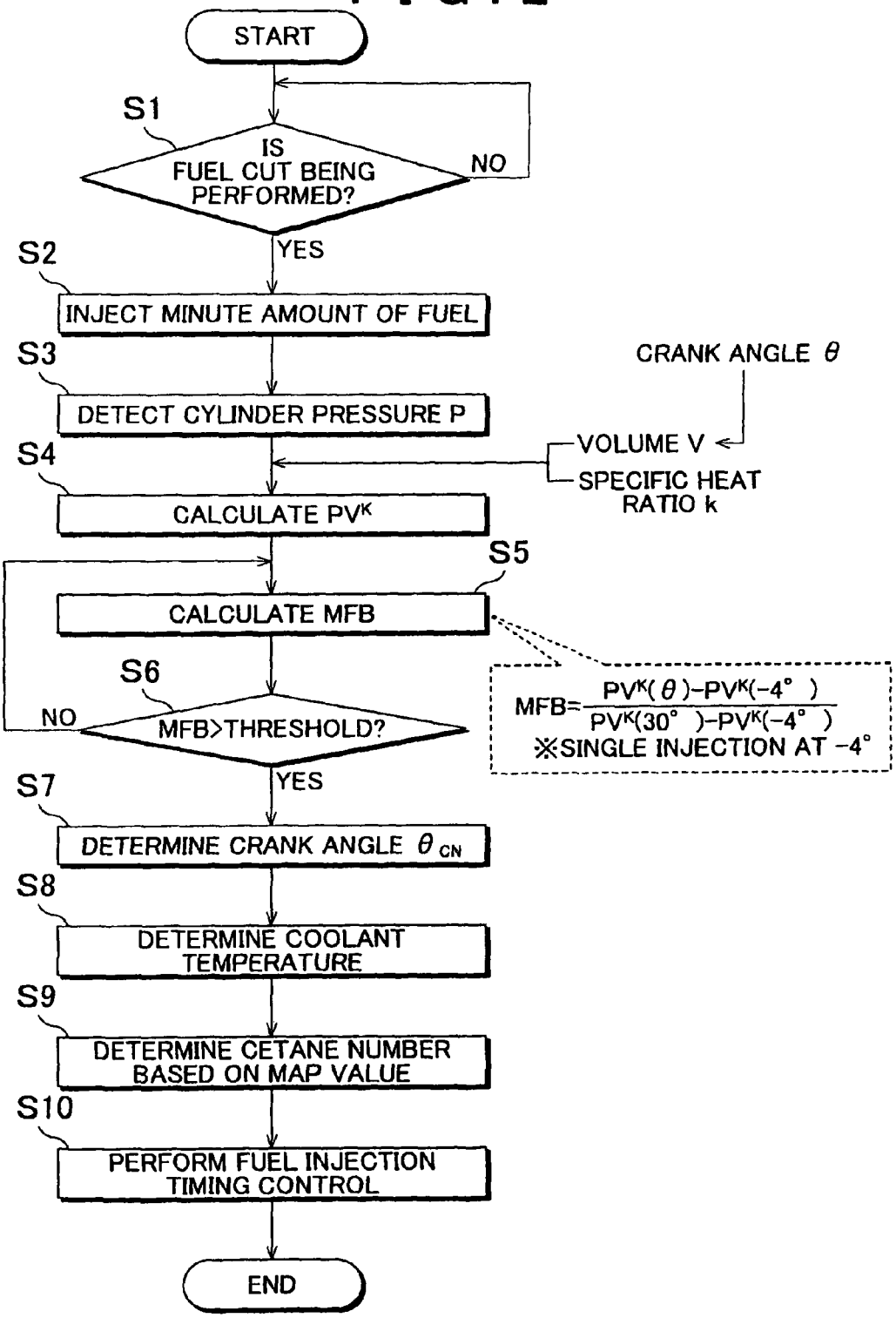
FIG. 2 is a flowchart showing an example of a cetane number determination process performed by an ECU.
Figure 3:
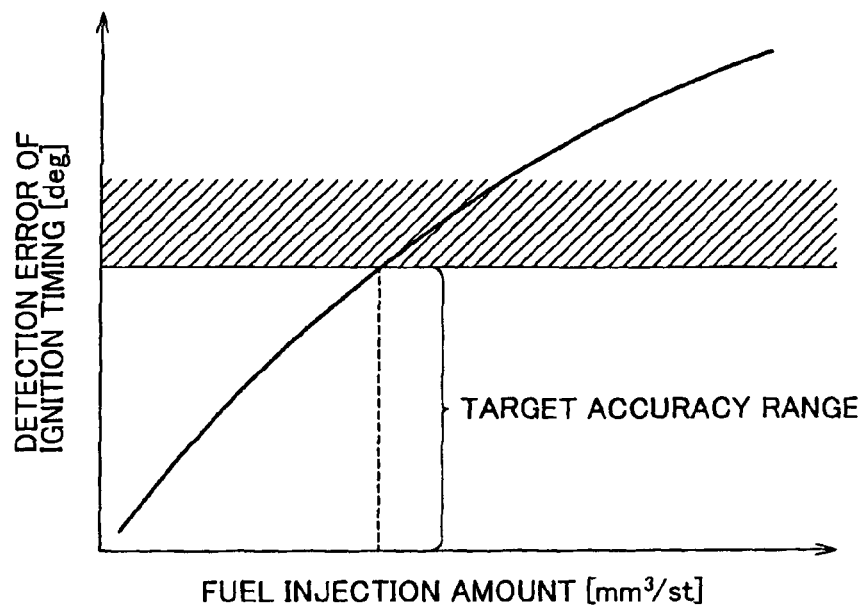
FIG. 3 is a chart showing a relation between a fuel injection amount and a detection error of an ignition timing.
Figure 4:
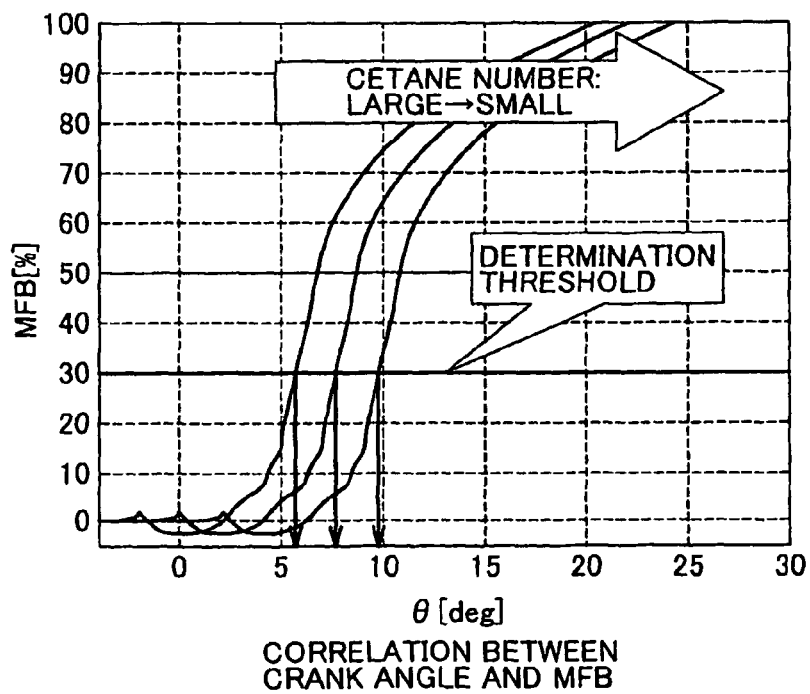
FIG. 4 is a chart showing a correlation between a crank angle and MFB.
Figure 5:
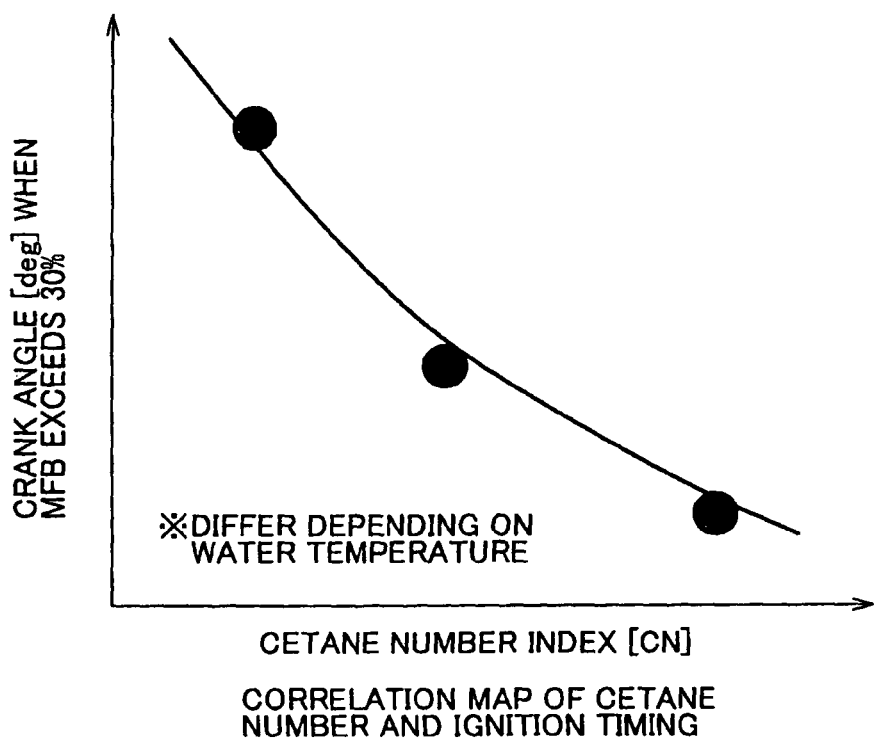
FIG. 5 is a chart showing a correlation between the cetane number and the ignition timing.

Next, one example of a cetane number determination process performed by the ECU 25 will be described with reference to FIGS. 2 to 5. FIG. 2 is a flowchart showing one example of the cetane number determination process performed by the ECU 25, and FIG. 3 is a chart showing a relation between the fuel injection amount and the detection error of ignition timing. Further, FIG. 4 is a chart showing a correlation between the crank angle and MFB, and FIG. 5 is a chart showing a correlation between the cetane number and the ignition timing.

As shown in FIG. 2, if fuel cut is being performed, that is, the fuel injection from the fuel injection valve 11 is stopped, for example, when the vehicle is running on a slope road (downhill road) (step S1), the ECU 25 controls the fuel injection valve 11 to inject a minute amount of fuel into the combustion chamber 12 (step S2). The minute amount of fuel signifies the amount of fuel that keeps the driver unaware of an increase of an engine speed, or the amount of fuel that hardly influences the torque. Further, the detection error of the ignition timing is a difference between an actual ignition timing and an ignition timing detected based on ΔPV$^κ$ determined based on a cylinder pressure P, a volume V of the combustion chamber 12, and a specific heat ratio κ, which will be described later. The fuel injection amount and the detection error of the ignition timing are correlated with each other, for example, as shown in FIG. 3. The correlation such as that shown in FIG. 3 is experimentally obtained. As it can be understood from the chart in FIG. 3, as the fuel injection amount becomes larger, the detection error of the ignition timing when the ignition timing is detected becomes larger. Therefore, the fuel injection amount is set to the minute amount so that the detection accuracy of the ignition timing is within the target accuracy range.

Next, the cylinder pressure P is detected using the cylinder pressure sensor 40 (step S3). At the same time, the volume V of the combustion chamber 12 is determined based on a crank angle θ determined using the crank angle sensor 37, and the specific heat ratio κ is also determined. Then, the value of PV$^κ$ is calculated using the cylinder pressure P, the volume V of the combustion chamber 12, and the specific heat ratio κ (step S4). PV$^κ$ is a parameter that is substantially proportional to a heat generation amount Q. Further, the value of PV$^κ$ is calculated, for example, each time the crank angle θ changes by one degree.

Next, a combustion ratio MFB (θ), which is the ratio of combustion in the cylinder with respect to the crank angle θ, is calculated using the calculated value of PV$^κ$. MFB is represented by an equation 1 below, for example, when a combustion start point is −4°, a combustion midpoint, at which the cetane number should be determined, is θ, and a combustion end point is 30°.

[Equation 1]

$$MFB(\theta) = \frac{PV^\kappa(\theta) - PV^\kappa(-4°)}{PV^\kappa(30°) - PV^\kappa(-4°)} \quad (1)$$

Next, as shown in FIG. 4, the calculated value of MFB (θ) is compared with a determination threshold (for example, 30%) (step S6) so as to determine a crank angle $\theta_{CN}$ when the value of MFB (θ) is equal to or more than the determination threshold (step S7). Note that, as shown in FIG. 4, the cetane number and MFB are correlated with each other. That is, as the cetane number becomes smaller, the crank angle $\theta_{CN}$ becomes larger.

Next, the temperature of an engine coolant is determined (step S8). A cetane number index CN is correlated with the crank angle $\theta_{CN}$ when the value of MFB (θ) exceeds the determination threshold (for example, 30%) as shown in FIG. 5. The correlation is mapped in accordance with the temperature of the engine coolant, and the cetane number index CN that corresponds to the crank angle $\theta_{CN}$ determined in step S7 is determined based on the map (step S9).

Then, an injection timing control is performed so that the fuel is injected at the optimal timing in accordance with the determined cetane number (step S10).

As described above, according to the embodiment, MFB correlated with the cetane number is used for determining the cetane number, and the calculation of MFB does not involve any complicated process, such as a differentiation process. Therefore, the accuracy of the result of the MFB calculation is high, and thus, it is possible to obtain a high signal-to-noise ratio (S/N ratio).

Figure 6:
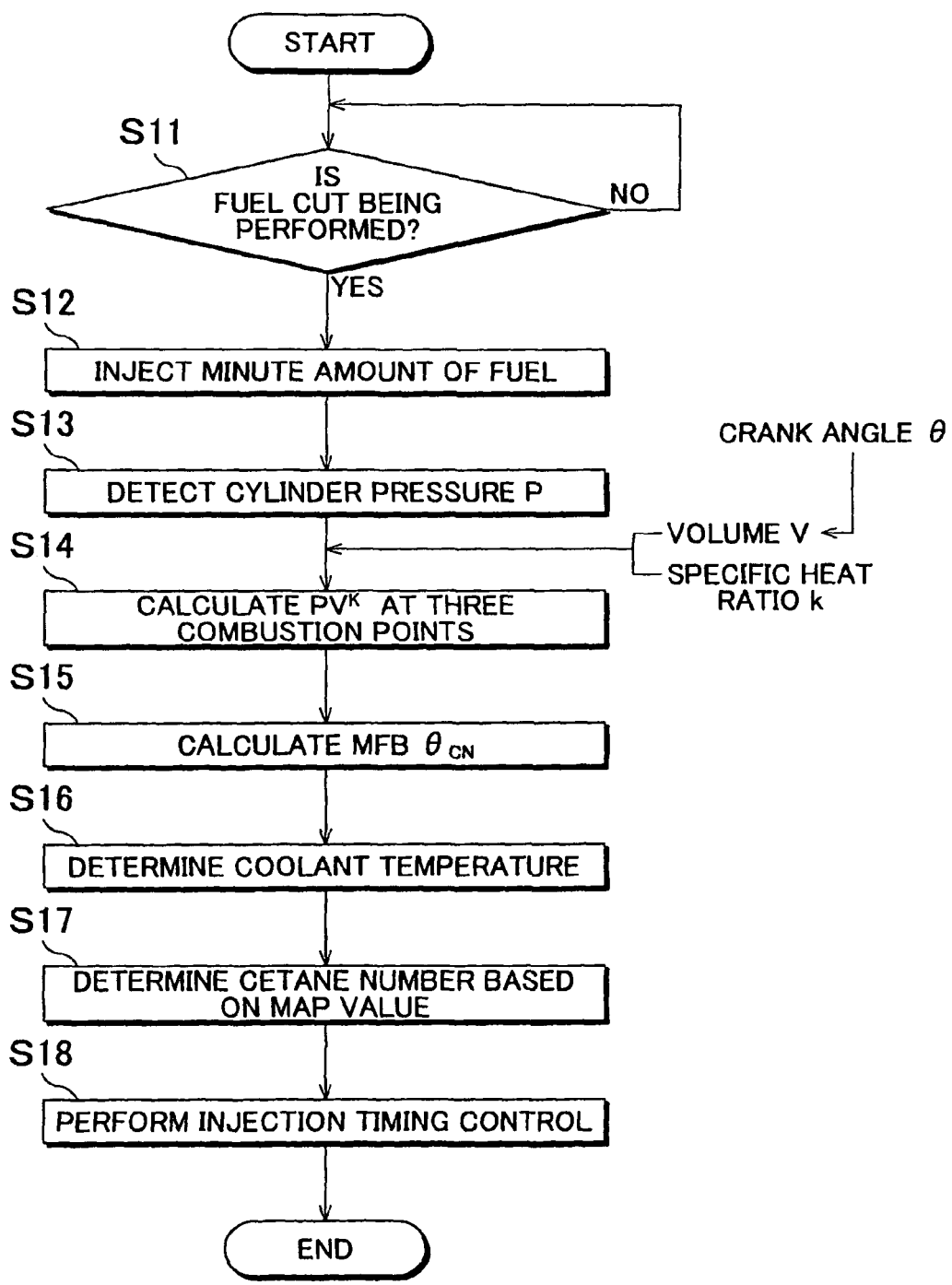
FIG. 6 is a flowchart showing another example of the cetane number determination process performed by the ECU.
Figure 7:
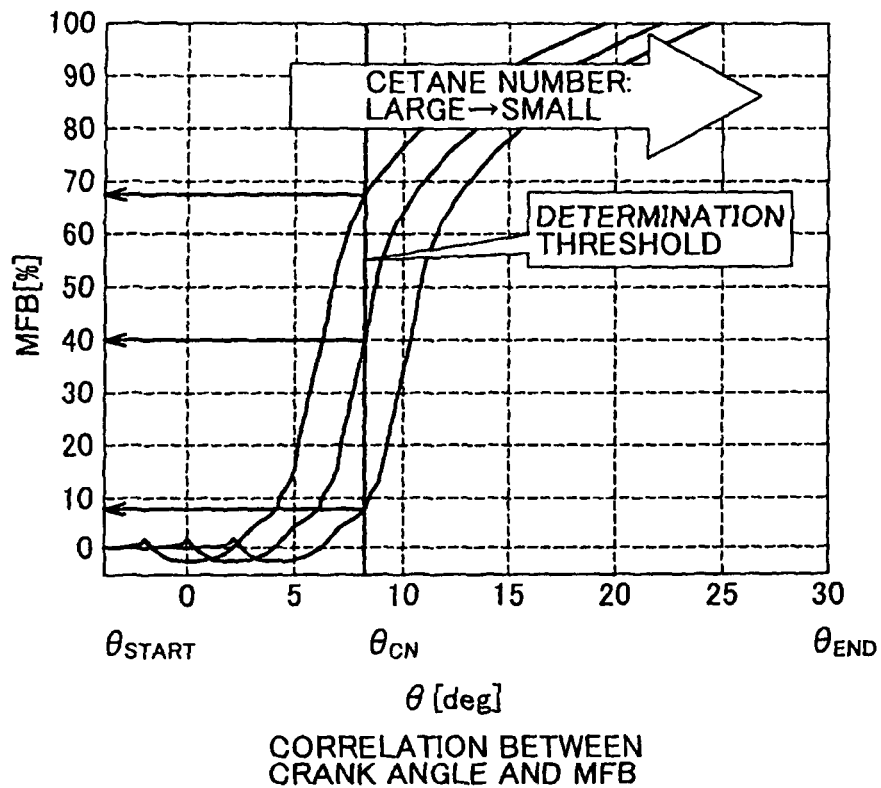
FIG. 7 is a chart explaining a method of determining the cetane number.
Figure 8:
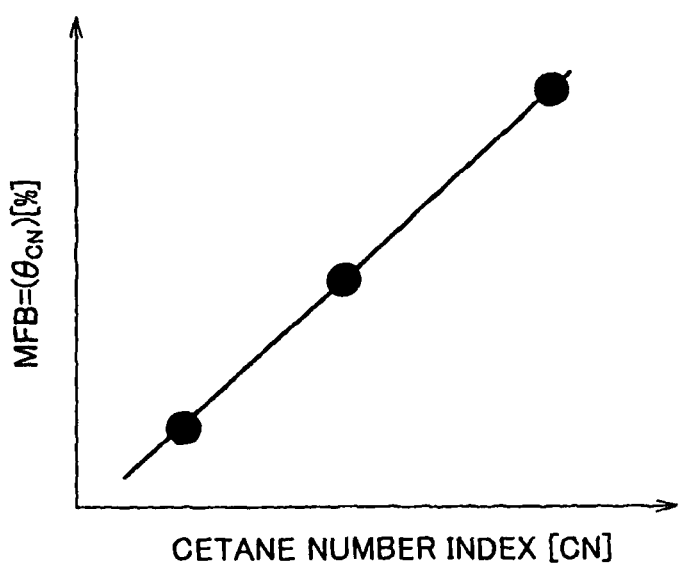
FIG. 8 is a chart showing a correlation between a cetane number index and MFB.

Next, another example of the cetane number determination process performed by the ECU 25 will be described with reference to FIGS. 6 to 8. FIG. 6 is a flowchart showing another example of the cetane number determination process performed by the ECU 25, and FIG. 7 is a chart explaining a method of determining the cetane number. Further, FIG. 8 is a chart showing a correlation between the cetane number index and MFB.

As shown in FIG. 6, if fuel cut is being performed, that is, the fuel injection from the fuel injection valve 11 is stopped, for example, when the vehicle is running on a slope road (downhill road) (step S11), the ECU 25 controls the fuel injection valve 11 to inject a minute amount of fuel into the combustion chamber 12 (step S12). As described above, the minute amount of fuel signifies the amount of fuel that keeps the driver unaware of the increase of the engine speed, or the amount of fuel that hardly influences the torque.

Next, the cylinder pressure P is detected using the cylinder pressure sensor 40 (step S13). At the same time, the volume V of the combustion chamber 12 is determined based on a crank angle θ determined using the crank angle sensor 37, and the specific heat ratio κ is also determined. Then, the values of PV$^κ$ are calculated using the cylinder pressure P, the volume V of the combustion chamber 12, and the specific heat ratio κ (step S14). As shown in FIG. 7, the value of PV$^κ$ at the combustion start point $\theta_{start}$, the value of PV$^κ$ at the combustion midpoint $\theta_{CN}$ (for example, 8°) at which the cetane number should be determined, and the value of PV$^κ$ at the combustion end point $\theta_{END}$ are calculated.

As it can be understood from FIG. 7, the combustion midpoint $\theta_{CN}$ serves as the determination threshold.

Next, the combustion ratio MFB ($\theta_{CN}$), which is the ratio of combustion in the cylinder with respect to the crank angle. $\theta_{CN}$ at the combustion midpoint at which the cetane number should be determined, is calculated according to an equation 2 below, using PV$^κ(\theta_{start})$, PV$^κ(\theta_{CN})$, and PV$^κ(\theta_{END})$.

[Equation 2]

$$MFB(\theta_{CN}) = \frac{PV^\kappa(\theta_{CN}) - PV^\kappa(\theta_{START})}{PV^\kappa(\theta_{END}) - PV^\kappa(\theta_{START})} \quad (2)$$

Next, the temperature of the coolant is read (step S16). The cetane number index CN, the determination threshold $\theta_{CN}$, and MFB ($\theta_{CN}$) are correlated with each other as shown in FIG. 8 (the correlation varies depending on the temperature of the coolant), and the correlation is preliminarily mapped. The cetane number index CN that corresponds to MFB ($\theta_{CN}$) determined in step S15 is determined based on the map (step S17).

Then, the injection timing control is performed so that the fuel is injected at the optimal timing in accordance with the determined cetane number (step S18).

As described above, according to the embodiment, MFB ($\theta_{CN}$) is determined using PV$^κ(\theta_{start})$, PV$^κ(\theta_{CN})$, and PV$^κ(\theta_{END})$, and the cetane number is directly determined based on MFB ($\theta_{CN}$) thus determined. Accordingly, the processing load is further reduced, and it is possible to determine the cetane number with higher accuracy.

In the embodiments described above, it is determined whether fuel cut is being performed when the minute amount of fuel is injected into the combustion chamber 12. However, it may be determined whether a condition of fuel cut is met when a minute amount of fuel is injected into a combustion chamber.

The invention claimed is:

1. A cetane number determination apparatus for a diesel engine, comprising:
   a cylinder pressure sensor that detects a pressure in a cylinder of the diesel engine;
   a crank angle sensor that detects a rotational position of a crankshaft of the diesel engine; and
   a control device that calculates the combustion ratio at a threshold crank angle at a combustion midpoint based on a first pressure in the cylinder at a first crank angle at a combustion start point, a second pressure in the cylinder at a second crank angle at a combustion end point, and a third pressure in the cylinder at the threshold crank angle, and determines the cetane number based on the combustion ratio at the threshold crank angle.

2. The cetane number determination device according to claim 1, wherein the control device executes a control so that a minute amount of fuel is injected into a combustion chamber during fuel cut or when a condition of fuel cut is met, and the control device calculates the combustion ratio at the threshold crank angle when the minute amount of the fuel is being combusted.

3. The cetane number determination apparatus according to claim 1, wherein:
   a second correlation map of the cetane number and the combustion ratio at the threshold crank angle is stored in the control device; and
   the control device calculates the combustion ratio at the threshold crank angle, and determines the cetane number based on the calculated combustion ratio at the threshold crank angle and the second correlation map.

4. The cetane number determination device according to claim 3, wherein a plurality of the second correlation maps that differ depending on a temperature of a coolant in the diesel engine are stored in the control device.

5. The method of determining a cetane number for a diesel engine, comprising:
   detecting a first pressure in a cylinder at a first crank angle at a combustion start point, a second pressure in the cylinder at a second crank angle at a combustion end point, and a third pressure in the cylinder at a threshold crank angle at a combustion midpoint;
   calculating a combustion ratio at the threshold crank angle based on the first pressure, the second pressure, and the third pressure; and
   determining the cetane number based on a correlation map of the calculated combustion ratio at the threshold crank angle and the cetane number.

6. The method of determining a cetane number for a diesel engine according to claim 5, further comprising:
   detecting a temperature of a coolant in the diesel engine; and
   selecting one correlation map that corresponds to the detected temperature of the coolant among a plurality of the correlation maps that differ depending on the temperature of the coolant, and determining the cetane number based on the selected correlation map.

* * * * *